(12) United States Patent
Mashimo

(10) Patent No.: US 7,568,761 B2
(45) Date of Patent: Aug. 4, 2009

(54) CLIP FOR HANGING AND FIXING TRIM COVER

(75) Inventor: Tomoyuki Mashimo, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 11/576,099

(22) PCT Filed: Sep. 29, 2005

(86) PCT No.: PCT/JP2005/018484

§ 371 (c)(1),
(2), (4) Date: Apr. 20, 2007

(87) PCT Pub. No.: WO2006/036006

PCT Pub. Date: Apr. 6, 2006

(65) Prior Publication Data

US 2007/0257531 A1 Nov. 8, 2007

(30) Foreign Application Priority Data

Sep. 29, 2004 (JP) ............................. 2004-285051

(51) Int. Cl.
*A47C 31/00* (2006.01)
(52) U.S. Cl. ............... 297/218.4; 297/218.1; 297/218.5
(58) Field of Classification Search .............. 297/218.1, 297/218.2, 218.3, 218.4, 218.5
See application file for complete search history.

(56) References Cited

U.S. PATENT DOCUMENTS

| 3,216,026 | A | * | 11/1965 | Mann .............................. 5/616 |
| 3,630,572 | A | * | 12/1971 | Homier .................... 297/452.6 |
| 4,865,383 | A | * | 9/1989 | Sbaragli et al. .......... 297/218.2 |
| 6,048,025 | A | * | 4/2000 | Tillner ..................... 297/218.1 |
| 6,122,806 | A | * | 9/2000 | Umezawa et al. .......... 24/598.6 |
| 6,568,761 | B2 | * | 5/2003 | Perske et al. ............. 297/452.6 |
| 7,287,305 | B2 | * | 10/2007 | Bednarski ..................... 24/297 |

FOREIGN PATENT DOCUMENTS

| EP | 359643 A1 * | 3/1990 |
| JP | 112198/1990 | 9/1990 |
| JP | 19399/1991 | 2/1991 |
| JP | 4-97772 | 3/1992 |
| JP | 2001-29676 | 2/2001 |

* cited by examiner

*Primary Examiner*—Sarah B McPartlin
(74) *Attorney, Agent, or Firm*—Shoemaker and Mattare

(57) ABSTRACT

A clip for hanging and fixing a trim cover, comprising a chuck section 6a having a substantially U-shaped body and a pair of reverse claws 61a, 61b extending inward from both edges of the substantially U-shaped body so as to be opposed to each other for pressing a portion of a beading 3a, provided along a longitudinal edge of a hanging cord 3, in an opening of the substantially U-shaped body and causing the portion of the beading 3a to be engaged with the opening of the substantially U-shaped body, and a hook section 6b for hanging and holding an axial portion of an insert wire, the hook section 6b formed integrally with the chuck section 6a so as to extend in such a direction as to be away from the chuck section 6a.

3 Claims, 2 Drawing Sheets

CLIP FOR HANGING AND FIXING TRIM COVER

FIELD OF THE INVENTION

The present invention relates to a clip which is adapted to be coupled between a hanging cord attached to a terminal of a trim cover covering a cushioned padding of a seat, and an exposed axial portion of an insert wire provided in the cushion padding so as to be partially exposed from the cushioned padding, and which facilitates hanging and fixing of the terminal of the trim cover.

BACKGROUND OF THE INVENTION

When a vehicle seat is to be assembled, a hanging bag having a core wire is sewn to a terminal of a trim cover covering a cushioned padding for a cushion of the vehicle seat, an insert wire is embedded in the cushioned padding so as to be partially exposed from the cushioned padding, and C-rings or springs are caught by the core wire of the hanging bag and exposed axial portions of the insert wire, thereby hanging and fixing the terminal of the trim cover covering the cushioned padding (Japanese Patent Application Laid-Open Nos. Hei. 7-328249 and 2001-61598).

In the trim cover hanging and fixing structure, positions to which the C-rings are shot or positions at which the springs are caught will vary for each C-ring or spring. As a result, the terminal of the trim cover is hanged so as to be partially drawn deeply and, therefore, substantially dimple-shaped recesses are easy to be produced in the trim cover and/or twist of hanging lines of the trim cover is easy to occur. If the substantially dimple-shaped recesses are produced in the trim cover and/or the twist of the hanging lines occurs, in order to dissolve such problems, once removal of the C-rings or springs must be performed and re-attaching operation of them must be then carried out. Such a correction operation will take a lot of time.

In addition to the case where the trim cover is hanged and fixed by means of the C-rings or springs, there has been proposed a trim cover hanging and fixing structure in which a hanging cord, which has a plurality of spaced apart hook portions arranged at predetermined intervals along a longitudinal direction thereof and adapted to be caught by exposed axial portions of an insert wire provided in a cushioned padding so as to be partially exposed to a recess portion of the cushioned padding from the cushioned padding, is sewn to a terminal of a trim cover, and the hook portions of the hanging cord are caught by the exposed axial portions of the insert wire, whereby predetermined hanging lines of the trim cover are produced in the trim cover by the hanging cord (Japanese Patent Application Laid-Open No. 2004-337).

With the trim cover hanging and fixing structure which employs the hanging cord provided with the hook portions, the sewing of the hanging cord to the terminal of the trim cover and forming of the cushioned padding must be carried out in such a manner that the recess portion of the cushioned padding to which the axial portions of the insert wire are exposed is allowed to be positionally coincided with the hook portions of the hanging cord.

SUMMARY OF THE INVENTION

It is a main object of the present invention to provide a clip for hanging and fixing a trim cover for a cushion of a seat, which facilitates easy positioning of a terminal of the trim cover with respect to exposed axial portions of an insert wire provided in a cushioned padding for the cushion, when the terminal of the trim cover is to be hanged and fixed, and which, even if any substantially dimple-shaped recesses are produced in the trim cover and/or twist of hanging lines of the trim cover occurs, facilitates dissolving of such problems.

In accordance with the invention there is provided a clip for hanging and fixing a trim cover for a cushion of a seat, the cushion including a cushioned padding, a trim cover covering the cushioned padding, a hanging cord provided at a terminal of the trim cover, a longitudinal beading provided at the hanging cord, and an insert wire provided in the cushioned padding so as to be partially exposed from the cushioned padding, the clip being adapted to be coupled between the hanging cord and the insert wire, the clip comprising a chuck section for holding and retaining a portion of the longitudinal beading, the chuck section comprising a substantially U-shaped body for receiving the portion of the longitudinal beading, and a pair of spaced apart reverse claws extending inward from both edges of the substantially U-shaped body so as to be opposed to each other for pressing the portion of the longitudinal beading in an opening of the substantially U-shaped body and causing the portion of the longitudinal beading to be engaged with the opening of the substantially U-shaped body, and a hook section for hanging and holding corresponding one of exposed axial portions of the insert wire, the hook section being formed integrally with the chuck section so as to extend in such a direction as to be away from the chuck section, the hook section comprising a substantially J-shaped body adapted to be hooked on the corresponding one of the exposed axial portions of the insert wire, and the substantially J-shaped body extending from a substantially center region of an outer bottom surface of the substantially U-shaped body of the chuck section in such a manner that a tip end thereof is shifted laterally from a side of the substantially U-shaped body of the chuck section.

The substantially J-shaped body may include a reverse claw extending inward from the tip end of the substantially J-shaped body for pressing the exposed axial portion of the insert wire in an opening of the substantially J-shaped body and causing the exposed axial portion of the insert wire to be engaged with the opening of the substantially J-shaped body.

As discussed above, the clip according to the invention comprises the chuck section for holding and retaining the portion of the longitudinal beading provided at the hanging cord, and the hook section formed integrally with the chuck section so as to extend in such a direction as to be away from the chuck section for holding and hanging the exposed axial portion of the insert wire. The entire clip has a fixed construction, so that when a plurality of the clips are employed, they make it possible to cause a hanging depth of the terminal of the trim cover to be maintained constant at several regions of the terminal of the trim cover. In addition, the chuck section can be easily and securely coupled to the hanging cord, without being separated from the hanging cord.

Moreover, the entire clip can be easily shifted by causing the chuck section to be moved along the longitudinal beading of the hanging cord, so that at a hanging and fixing step of the terminal of the trim cover, positioning of the clip with respect to the exposed axial portion of the insert wire provided in the cushioned padding can be easily carried out. In addition, even if any substantially dimple-shaped recesses are produced in the trim cover and/or twist of hanging lines of the trim cover occurs, such problems can be easily dissolved by shifting the entire clip with respect to the longitudinal beading by the movement of the chuck section along the longitudinal beading, or by shifting the hook section with respect to the insert wire by the movement of the entire clip. Moreover, the substantially J-shaped body extends from the substantially center region of the outer bottom surface of the substantially U-shaped body of the chuck section in such a manner that the tip end thereof is shifted laterally from the side of the substantially U-shaped body of the chuck section, thus making it possible for the opening of the substantially J-shaped body to easily receive the axial portion of the insert wire.

As discussed above, the substantially J-shaped body may include the reverse claw extending inward from the tip end of the substantially J-shaped body for pressing the exposed axial portion of the insert wire in the opening of the substantially J-shaped body and causing the exposed axial portion of the insert wire to be engaged with the opening of the substantially J-shaped body. In this case, the hook section can be easily and securely coupled to the insert wire, without being separated from the insert wire.

BRIEF DESCRIPTION OF THE DRAWINGS

The object and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

Figure 1:
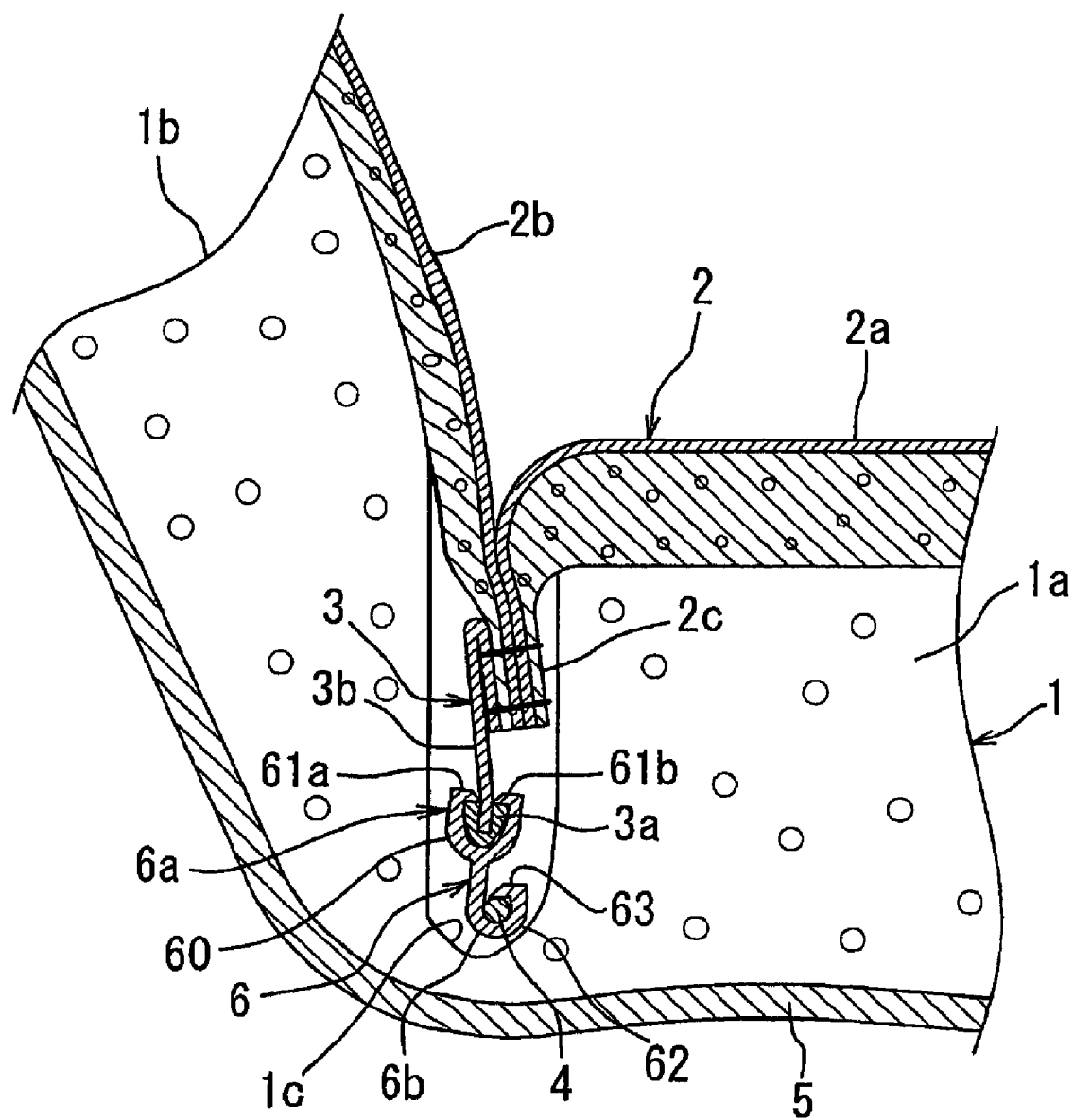
FIG. 1 is a schematic sectional view which is of assistance in explaining a structure for hanging and fixing a trim cover, in which a clip according to the present invention is employed.

Referring to FIG. 1, there is illustrated a structure for hanging and fixing a trim cover, which is to be employed when a seat cushion of a vehicle seat is assembled. A trim cover 2 comprises a first covering section 2a for covering a portion 1a of a cushioned padding 1 of the seat cushion which positionally corresponds to a seating portion of the seat cushion on which an occupant is to sit, and a second covering section 2b for covering a bulged portion 1b of the cushioned padding 1 which positionally corresponds to a bank portion of the seat cushion on the right side of the occupant. A terminal of the first covering section 2a and a terminal of the second covering section 2b are sewn together, to thereby form a sewn terminal portion 2c. The sewn terminal portion 2c is hanged and fixed, whereby the trim cover 2 is attached to the cushioned padding 1 so as to cover the cushioned padding 1.

A hanging cord 3 is sewn to the sewn terminal portion 2c of the trim cover 2. The hanging cord 3 comprises a belt-shaped piece of cloth 3b and a longitudinal beading or welt 3a provided at a lower edge portion of the belt-shaped cloth piece 3b so as to extend along the lower edge portion of the cloth piece 3b. The hanging cord 3 is sewn at an upper portion of the cloth piece 3b thereof to the sewn terminal portion 2c of the trim cover 2. The beading 3a is made of a synthetic resin such as polypropylene or the like and resin-molded integrally with the lower edge portion of the cloth piece 3b. The longitudinal beading 3a may have a cross-sectional area larger than a thickness of the cloth piece 3b and have a shape of a substantially triangle, square, circle or the like in cross-section. The cloth piece 3b may be made of a piece of cloth material such as non woven fabric.

An insert wire 4 which is made of a metallic wire is embedded in the cushioned padding 1 so as to be partially exposed to a recess portion 1c of the cushioned padding 1 from the cushioned padding 1. In FIG. 1, reference numeral 5 denotes a backing sheet for the cushioned padding 1.

The sewn terminal portion 2c of the trim cover 2 is hanged and fixed by causing clips 6 (only one clip 6 is shown in FIG. 1) to be coupled between the longitudinal beading 3a of the hanging cord 3 and axial portions of the insert wire 4 which are exposed to the recess portion 1c from the cushioned padding 1.

Figure 2:
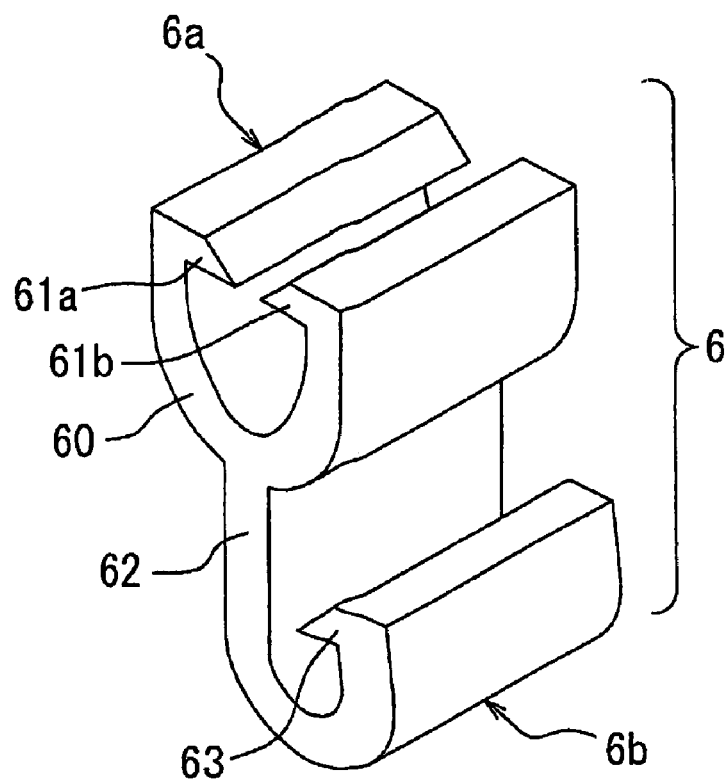
FIG. 2 is a schematic perspective view of the clip shown in FIG. 1.

Referring to FIG. 2, as each of the clips 6, there is employed a clip which comprises a chuck section 6a for holding and retaining a portion of the beading 3a of the hanging cord 3, and a hook section 6b for hanging and holding corresponding one of the exposed axial portions of the insert wire 4, the hook section 6b being formed integrally with the chuck section 6a so as to extend in such a direction as to be away from the chuck section 6a. The clip 6 is made of a synthetic resin such as polypropylene, polyethylene or the like.

The chuck section 6a of the clip 6 comprises a substantially U-shaped body 60 for receiving the portion of the longitudinal beading 3a, and a pair of spaced apart reverse claws 61a, 61b for pressing the portion of the longitudinal beading 3a of the hanging cord 3 in an opening of the substantially U-shaped body 60 and causing the portion of the beading 3a to be engaged with the opening of the substantially U-shaped body 60. The claws 61a, 61b extend inward from both edges of the substantially U-shaped body 60 so as to be opposed to each other.

The body 60 of the chuck section 6a has a depth sufficient to receive the portion of the longitudinal beading 3a and may be formed into a substantially C-shape which faces upward. The claws 61a, 61b are designed such that tip ends thereof can pinch a portion of the cloth piece 3b which is adjacent the lower edge portion of the cloth piece 3b to which the beading 3a is attached, and that they have lengths which allow the portion of the beading 3a to be pressed in the opening of the body 60 and engaged with the opening of the body 60. Moreover, the tip ends of the claws 61a, 61b are formed so as to have downward inclined slopes.

The hook section 6b of the clip 6 comprises a substantially J-shaped body 62 which extends downward from an outer bottom surface of the substantially U-shaped body 60 of the chuck section 6a. The substantially J-shaped body 62 has a reverse claw 63 extending inward from a tip end thereof for pressing the exposed axial portion of the insert wire 4 in an opening of the substantially J-shaped body 62 and causing the axial portion of the insert wire to be engaged with the opening of the substantially J-shaped body 62.

In the illustrated example, the body 62 of the hook section 6b is provided at a substantially center region of the outer bottom surface of the body 60 of the chuck section 6a in such a manner that the tip end of the body 62 is shifted laterally from a side of the body 60 of the chuck section 6a. This makes it to possible for the opening of the substantially J-shaped hook section 6b to easily receive the axial portion of the insert wire 4. The hook section 6b may be provided at any region of the outer bottom surface of the chuck section 6a in such a manner that the tip end of the body 62 is aligned with either of both sides of the substantially U-shaped body 60. The reverse claw 63 has a length which goes over a longitudinal center line of the insert wire 4 when the axial portion of the insert wire 4 is engaged with the opening of the substantially J-shaped body 62. Moreover, a tip end of the claw 63 is formed so as to have a downward inclined slope.

The clip 6 constructed as discussed above can be initially coupled to either of the beading 3a of the hanging cord 3 and the axial portion of the insert wire 4. Incidentally, in a case where the clip 6 is positioned with respect to the axial portion of the insert wire 4 which is exposed to the recess portion 1c from the cushioned padding 1, the hook section 6b may be caught in advance by the axial portion of the insert wire 4.

The coupling of the clip 6 to the beading 3a of the hanging cord 3 and the axial portion of the insert wire 4 may be carried out using any suitable holding-tool such as a driver, which has a substantially U-shaped tip portion which can receive and hold the entire clip 6, or has a bar-shaped tip portion which can be inserted in the opening of the hook section 6b.

When a portion of the beading 3a of the hanging cord 3 is applied onto the reverse claws 61a, 61b of the chuck section 6a and is then press-fitted into a space between the reverse claws 61a, 61b, the reverse claws 61a, 61b are made to flex in such a direction as to be away from each other while allowing the body 60 of the chuck section 6a to be elastically expanded, whereby the portion of the beading 3a of the hanging cord 3 can be easily received in the opening of the substantially U-shaped body 60. As soon as the portion of the beading 3a of the hanging cord 3 is operatively received in the opening of the body 60, the body 60 and the claws 61a, 61b are elastically restored to their original states and the reverse claws 61a, 61b then press the portion of the beading 3a in the opening of the U-shaped body 60 and pinch the portion of the cloth piece 3b therebetween. Thus, the chuck section 6a of the clip 6 is securely attached to the hanging cord 3 so as not to be separated from the hanging cord 3.

When the hook section 6b of the clip 6 is inserted at a lower portion thereof into a bottom of the recess portion 1c of the cushioned padding 1 in such a manner that the tip end of the hook section 6b is applied onto a lower surface of the axial portion of the insert wire 4, and is pulled upward, the reverse claw 63 is made to be deformed outward while allowing the body 62 of the hook portion 6b to be elastically expanded, whereby the axial portion of the insert wire 4 can be easily received in the opening of the substantially J-shaped hook section 6b. As soon as the axial portion of the insert wire 4 is operatively received in the opening of the substantially J-shaped hook portion 6b, the body 62 of the hook portion 6b and the reverse claw 63 are elastically restored to their original states and the reverse claw 63 then presses the axial portion of the insert wire 4 in the opening of the substantially J-shaped body 62. Thus, the hook section 6b of the clip 6 is securely coupled to the insert wire 4 so as not to be separated from the insert wire 4.

Figure 3:
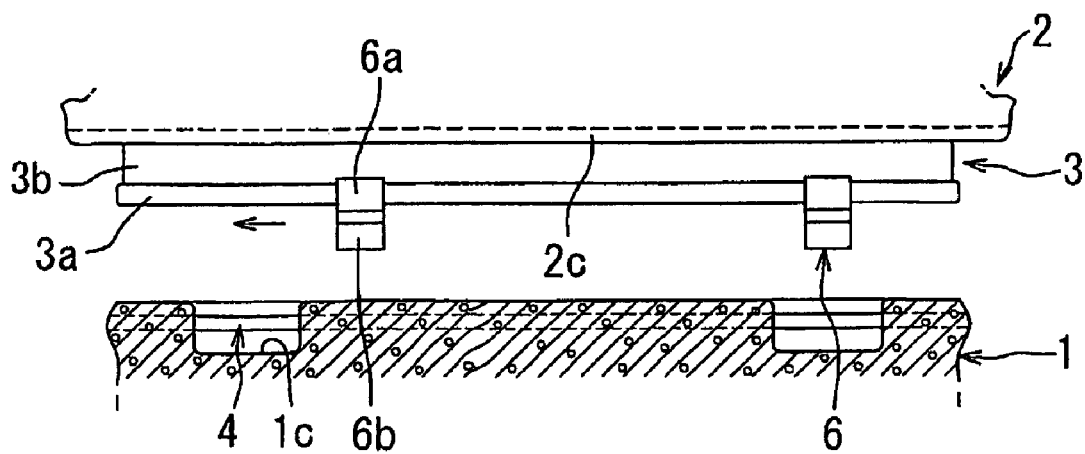
FIG. 3 is a schematic view which is of assistance in explaining an operation of positioning the clip of FIG. 1 with respect to an insert wire.

In a case where the chuck section 6a of the clip 6 is initially coupled to the hanging cord 3, if the entire clip 6 is shifted with respect to the corresponding one of the exposed axial portions of the insert wire 4, the entire clip 6 is shifted by causing the chuck section 6a to be moved along the longitudinal beading 3a of the hanging cord 3 as indicated in FIG. 3 by an arrow, thus making it possible to easily position the clip 6 with respect to the corresponding exposed axial portion of the insert wire 4.

Even if a plurality of the clips 6 are employed in order to hang and fix the trim cover 2, a hanging depth of the trim cover 2 can be maintained constant since the clips 6 have the fixed constructions. Moreover, in the condition where the clip 6 is coupled to the hanging cord 3 and the exposed axial portion of the insert wire 4, the chuck section 6a caught by the beading 3a of the hanging cord 3 and the hook section 6b caught by the exposed axial portion of the insert wire 4 are interacted with each other so as to be drawn toward each other, so that even if a weight of the occupant having sat on the seat is applied to the trim cover hanging and fixing structure, the clip 6 can be prevented from being separated from the hanging cord 3 and the insert wire 4.

When the trim cover 2 is hanged by the clip 6, even if any substantially dimple-shaped recesses are produced in the trim cover 2 and/or twist of hanging lines of the trim cover 2 occurs, such situations can be easily corrected by adjusting a position of the clip 6 with respect to the hanging cord 3 by moving the chuck section 6a along the beading 3a, or by adjusting a position of the hook section 6b with respect to the corresponding exposed axial portion of the insert wire 4 by moving the chuck section 6a along the beading 3a, before a peripheral terminal of the trim cover 2 is attached to a seat cushion frame (not shown).

While the above description is made in connection with the case where the trim cover for the seat cushion is hanged and fixed to the cushioned padding for the seat cushion by the clip, the clip according to the present invention may be applied to a case where a trim cover for a seat back is hanged and fixed to a cushioned padding for the seat back.

What is claimed is:

1. A clip for hanging and fixing a trim cover for a cushion of a seat, said cushion including a cushioned padding, a trim cover covering said cushioned padding, a hanging cord provided at a terminal of said trim cover, a longitudinal beading provided at said hanging cord, and an insert wire provided in said cushioned padding so as to be partially exposed from said cushioned padding, said clip being adapted to be coupled between said hanging cord and said insert wire, said clip comprising:

a chuck section for holding and retaining a portion of said longitudinal beading;

said chuck section comprising a substantially U-shaped body having two generally parallel sides and a bottom for receiving the portion of said longitudinal beading, and a pair of spaced apart reverse claws extending inward from both edges of said substantially U-shaped body so as to be opposed to each other for pressing said portion of said longitudinal beading in an opening of said substantially U-shaped body and causing said portion of said longitudinal beading to be engaged with said opening of said substantially U-shaped body; and a hook section for hanging and holding corresponding one of exposed axial portions of said insert wire;

said hook section being formed integrally with said chuck section so as to extend in such a direction as to be away from said chuck section;

said hook section comprising a substantially J-shaped body adapted to be hooked on the corresponding one of said exposed axial portions of said insert wire; and said substantially J-shaped body extending substantially perpendicularly from a substantially center region of said bottom of said substantially U-shaped body of said chuck section in such a manner that a tip end thereof is shifted laterally from a side of said substantially U-shaped body of said chuck section.

2. A clip according to claim 1, wherein said substantially J-shaped body includes a reverse claw extending inward from said tip end of said substantially J-shaped body for pressing said corresponding one of said exposed axial portions of said insert wire in an opening of said substantially J-shaped body and causing said corresponding one of said exposed axial portions of said insert wire to be engaged with said opening of said substantially J-shaped body.

3. A clip according to claim 2, wherein said reverse claw of said substantially J-shaped body is formed so as to have a downward inclined slope.

* * * * *